United States Patent Office 3,249,922
Patented May 3, 1966

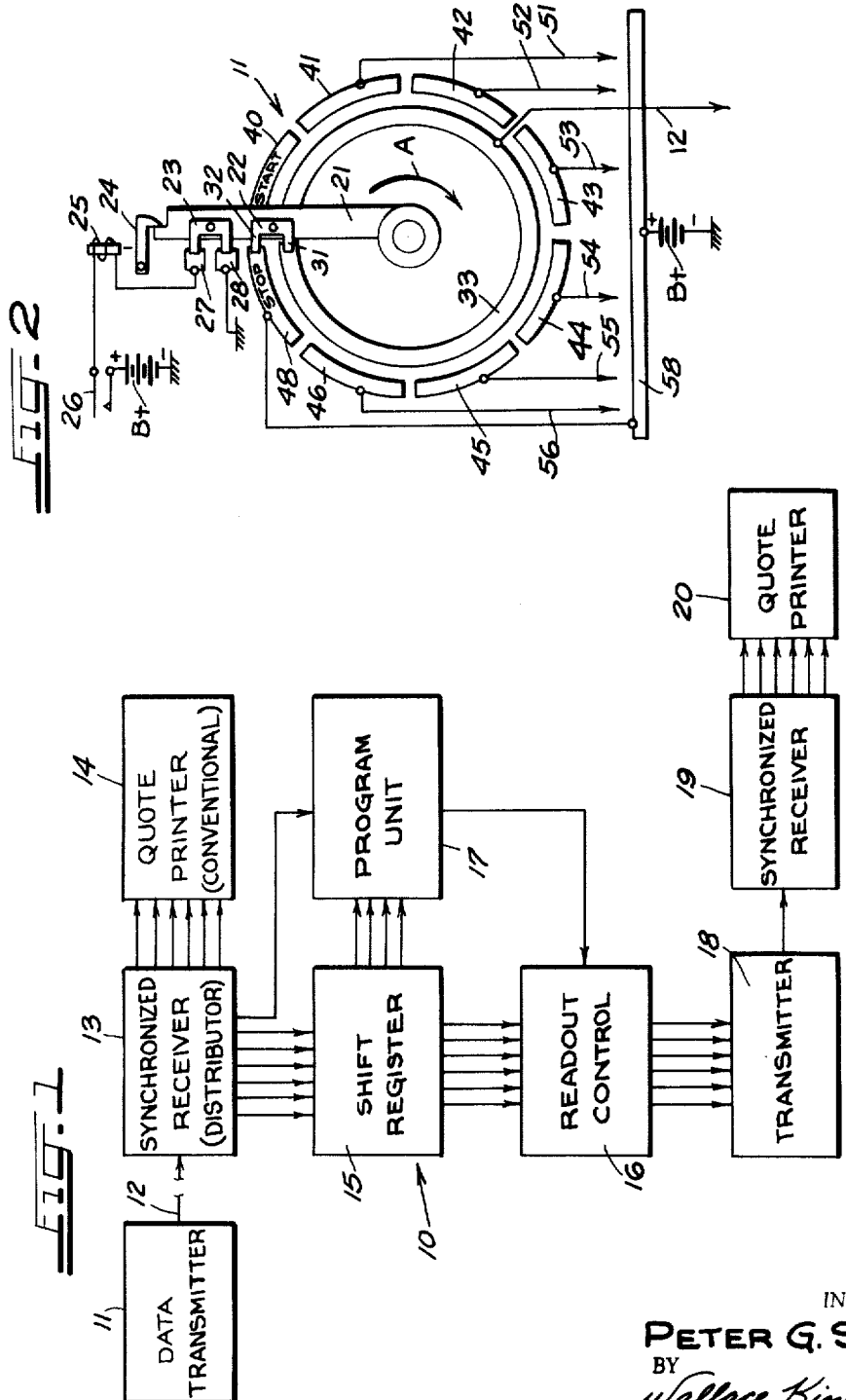

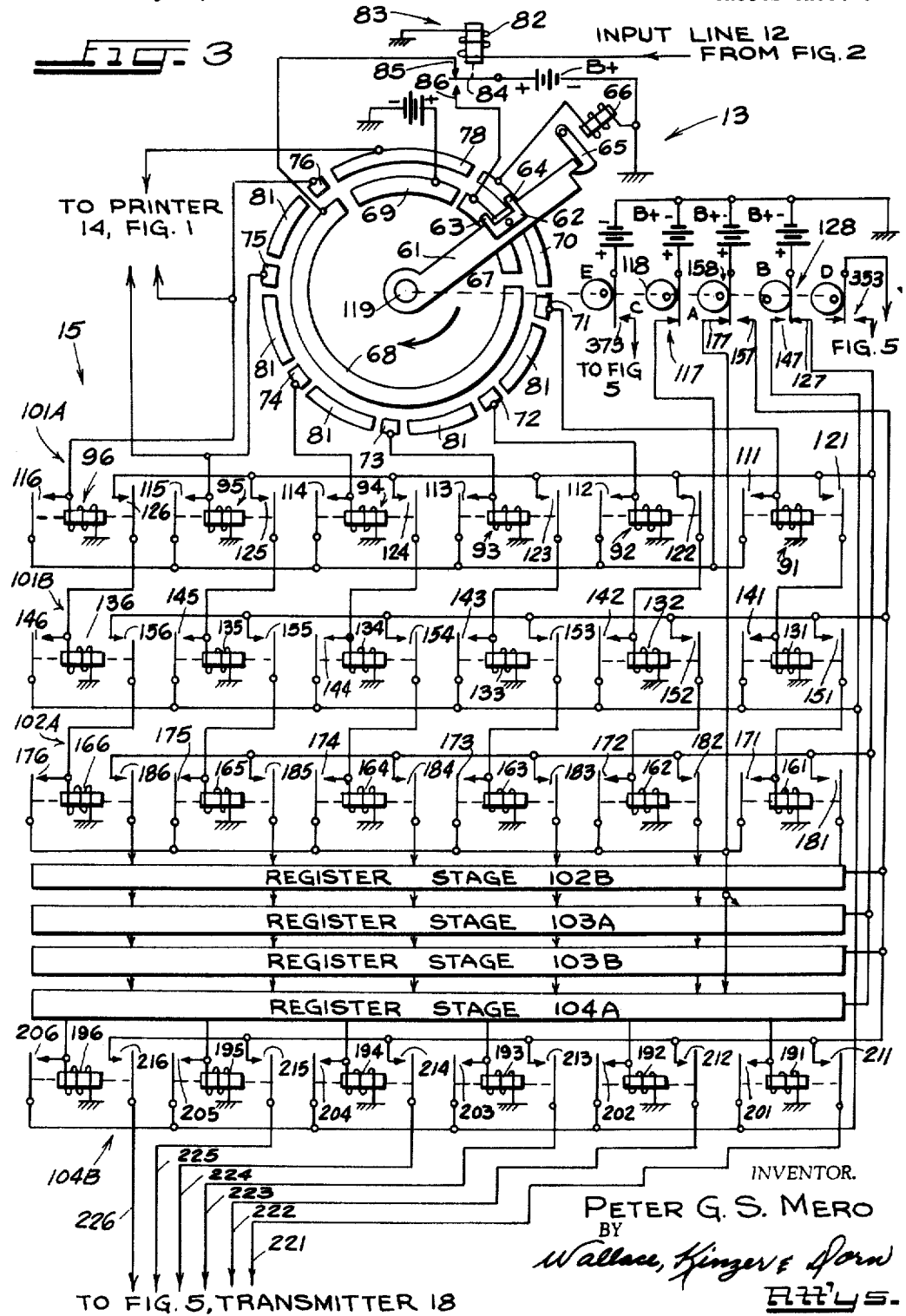

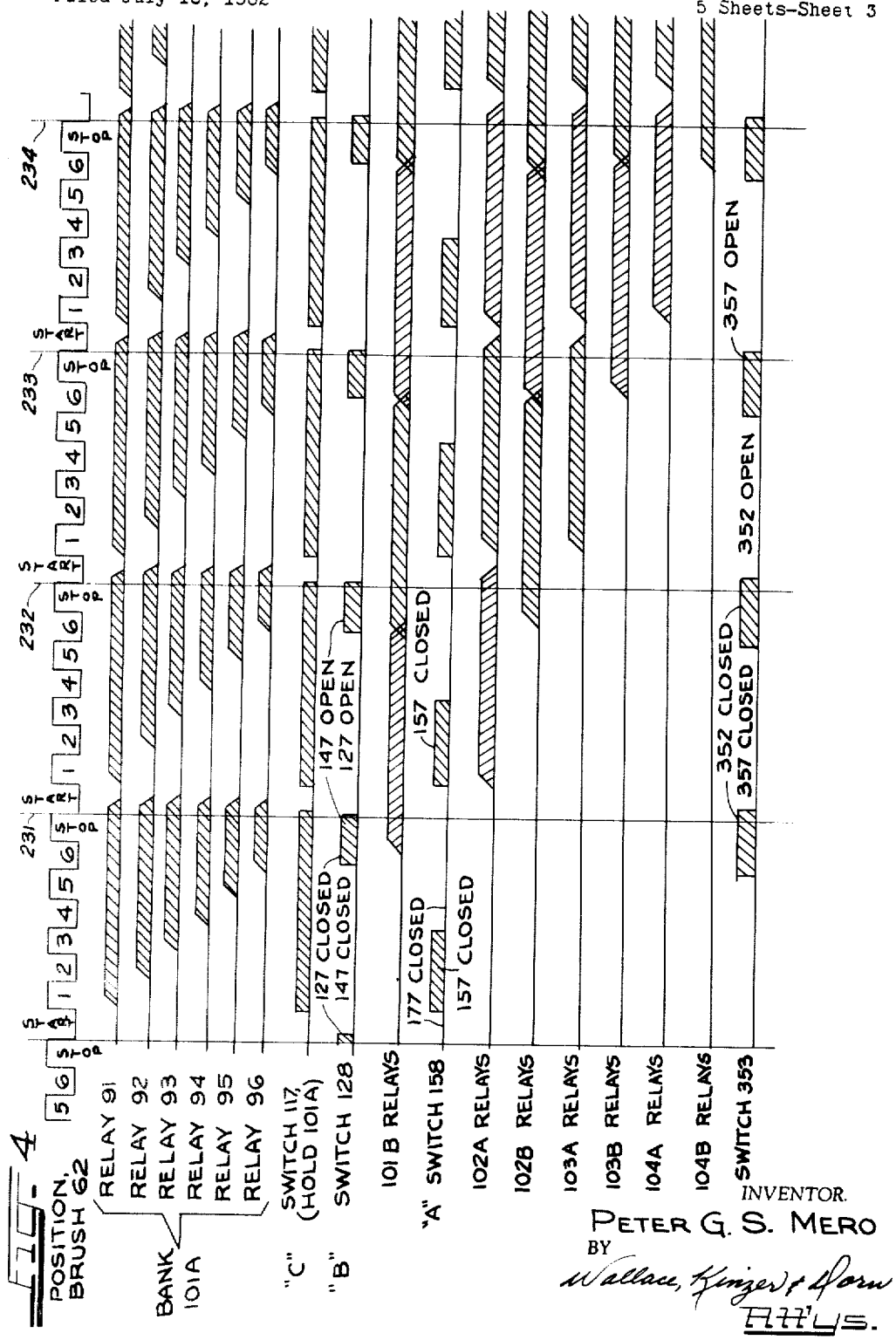

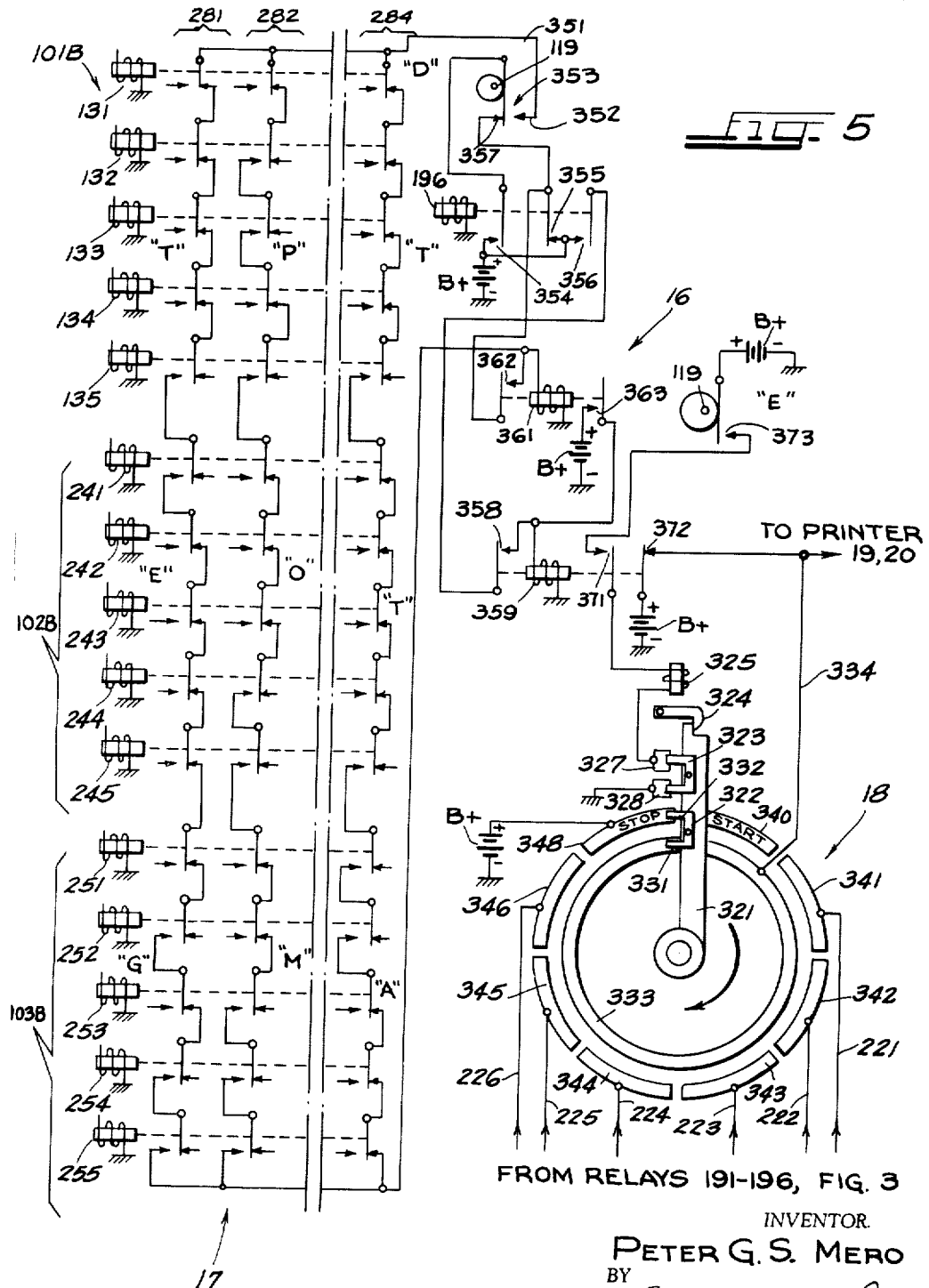

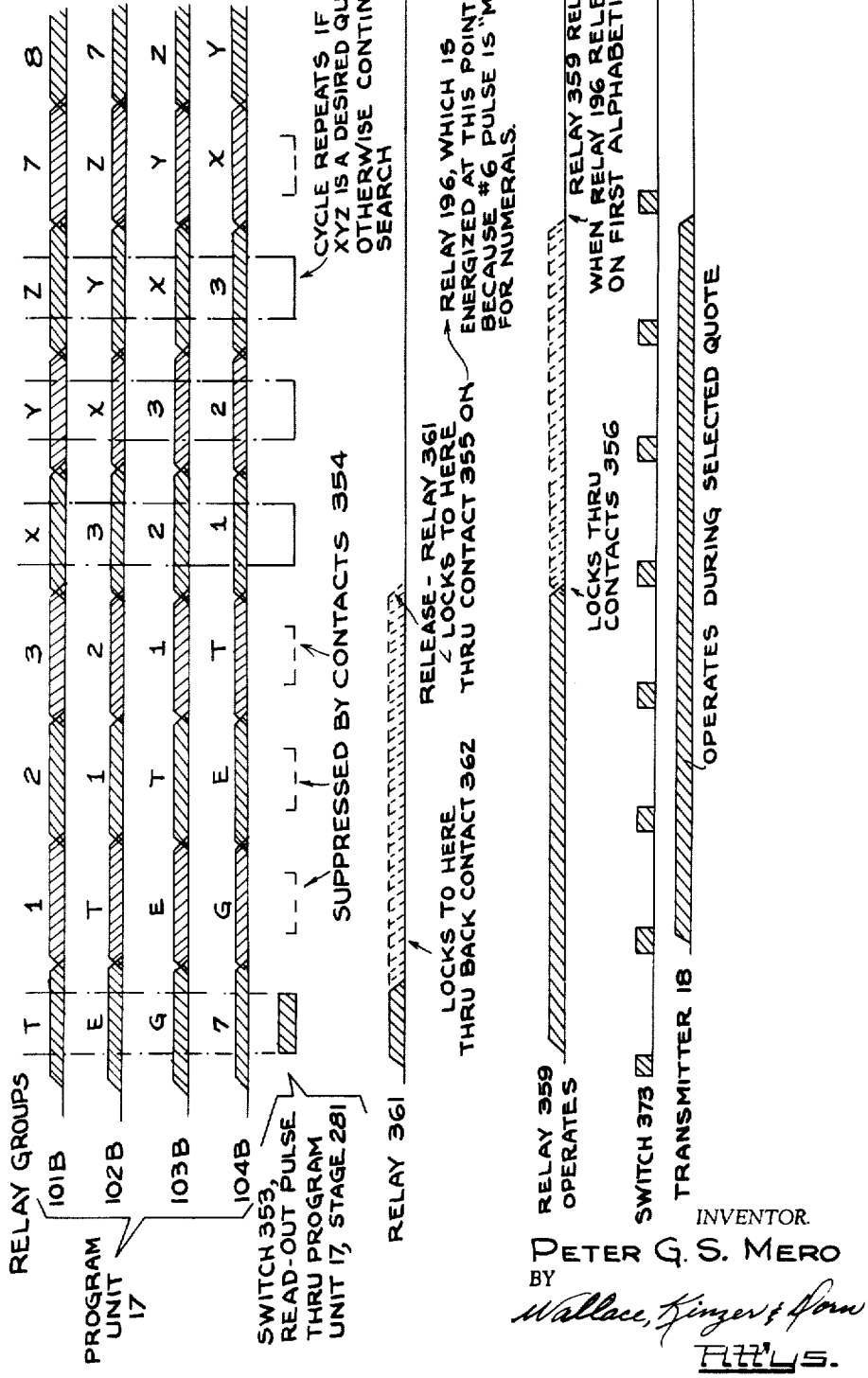

3,249,922
DATA EDITING SYSTEM
Peter G. S. Mero, 830 Mount Pleasant, Winnetka, Ill.
Filed July 16, 1962, Ser. No. 210,131
10 Claims. (Cl. 340—172.5)

This invention relates to a new and improved system for monitoring or editing a coded data transmission and particularly for monitoring or editing stock market quotations, commodity quotations, or like data.

In many instances, it may be desirable to keep a continuous check on the price fluctuations of a limited number of stocks, commodities, or the like. This can be accomplished by continuous review of a general series of quotations, of which those to be monitored are only a minor part, but this procedure is time consuming and generally wasteful. On the other hand, a similar monitoring operation can be carried out by electrical or electronic means that checks each received quotation in a received series against recorded data identifying the stocks, commodities, or the like to be monitored. The present invention relates to an editing or monitoring system of this kind.

A principal difficulty in an editing system for market quotations is the recognition of the beginning and end of each quotation. Individual quotations do not include a uniform number of characters, particularly in the numerical portions of the quotations. Moreover, the codes used for transmission of such data may not entail special code combinations indicating the beginning and end of individual items. Consequently, recognition of complete quotations becomes a substantial problem.

It is a principal object of the present invention, therefore, to edit a coded data transmission, regardless of the length of individual data items, on the basis of the encoded characters making up the transmitted data and without requiring special code symbols indicating the beginning and end of each complete data item.

A more specific object of the present invention is to monitor a conventional stock or commodity market quotation transmission, selecting only desired quotations therefrom, solely on the basis of the content of individual quotations and without requiring modification of the transmission code.

Another object of the invention is to provide a simple and inexpensive means to recognize the beginning and end of each stock or commodity quotation in a conventionally encoded transmission and to incorporate such means in an effective apparatus for selecting only desired quotations from a large and unclassified group transmitted.

A particular object of the invention is to utilize the usual permutation code used for market quotations, and particularly the characteristic code symbols identifying alphabetic and numeric characters, in an apparatus inherently effective to identify the first and last symbols in a given quotation.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is a block diagram of a data editing system constructed in accordance with the present invention;

FIG. 2 is a simplified schematic diagram of one form of transmitter apparatus with which the present invention may be employed;

FIG. 3 is a schematic illustration of a synchronized receiver distributor apparatus and a shift register comprising a part of the system illustrated in FIG. 1;

FIG. 4 is a timing chart for the shift register of FIG. 3;

FIG. 5 is a schematic diagram of the programming and readout control apparatus, and a part of the selective printing apparatus, of the data editing system of FIG. 1; and FIG. 6 is a timing chart illustrating the sequence of operations in the readout of data from the shift register to the selective printing apparatus of the system.

FIG. 1 illustrates a data editing system 10 particularly intended for preparation and presentation of stock market quotations, commodity quotations, and the like, constructed in accordance with one embodiment of the present invention. The system 10 comprises a data transmitter 11 which in many respects may be of conventional construction, one form of transmitter apparatus being described in further detail hereinafter in connection with FIG. 2. Transmitter 11 is effective to encode financial quotations, such as stock market and commodity quotations, in accordance with a conventional start-stop permutation code of the kind used for stock "ticker" operation. Assuming that a conventional stock market quotation code is employed, transmitter 11 encodes the data in a five-unit code, using a sixth code level to indicate whether alphabetic or numerical information is being transmitted and a seventh level to initiate and halt transmission of each character. A "space" code indication in the sixth level of the code is employed to indicate the transmission of alphabetic data and a "mark" indication at the sixth level of the code is employed to identify the transmission of numeric data.

Transmitter 11 is coupled by a suitable communication link 12, which may be a wire line or any other form of transmission medium, to a synchronized receiver distributor 13. Distributor 13, in many respects, may also be of substantially conventional construction, a particular form of distributor apparatus being shown in the detail schematic diagram of FIG. 3. The signals received at unit 13 are sequential in form and the distributor operates in synchronism with transmitter 11 to reproduce the code data initially available at the transmitter. As in a conventional system, distributor 13 may be connected to a printing apparatus 14 that prints all of the stock or other financial quotations without editing. Because such apparatus is quite well known in the art, the printer 14 is not described in greater detail herein.

Distributor 13 is also connected, however, to the first stage of a shift register 15. Shift register 15 comprises a plurality of stages, the received data from distributor 13 being transferred sequentially through the stages for transmission to a readout unit 16. The shift register is provided with one more stage than the maximum number of characters in the characterizing portions of the data items to be identified and printed on a selective basis.

In the following detailed description of the system, and particularly in connection with FIG. 3, it is assumed that each data item includes three letters that identify it as to subject matter. This assumption is based upon the selection of individual stocks from the listings of a major exchange, where each such security is identified, in the stock quotations, by a symbol of three letters or less. It should be understood, however, that the present invention is not dependent upon or limited to use with a three-letter identification system, but rather may be employed with data items having any given number of identifying symbols.

System 10 further includes a selector or program unit 17 which is coupled to each stage of shift register 15 and which is also coupled to the receiver distributor unit 13. Program unit 17 includes means for establishing the identity of the stocks, commodities, or other items to be selected and printed by the editing system. Thus, in a given application requiring monitoring of selected individual stock quotations from a general quotation service, the program unit would include means for recording the identifications of all of the companies to be monitored. The program unit may be physically separate from shift register 15 or, as described hereinafter, may comprise means for completing a series of electrical connections to the individual relays or other recording devices in the shift register. Preferably, the program unit is arranged to permit a change of the program recorded therein in order to provide for monitoring of different groups of stocks, commodities, or the like if desired in accordance with changes in the needs of the user. The output of the program unit is connected to readout unit 16 in order to control the readout unit and inhibit printing of any quotations other than those pre-selected for monitoring.

Readout unit 16 is connected to a transmitter 18 that is substantially similar to the initial data transmitter 11. Transmitter 18, in turn, is connected to a synchronized receiver distributor 19 that controls a quotation reproduction apparatus, in this instance a printer 20. Transmitter 18, distributor 19, and printer 20 may all be substantially conventional in construction. If desired, a tape punch, visual display, or other reproducing means may be substituted for printer 20.

In operation of the data editing system, stock market quotations are encoded and transmitted by transmitter 11 in accordance with a conventional start-stop permutation code. The output signals from the transmitter are conveyed, over the transmission link 12, to the synchronized receiver 13, and may be printed in their entirety by the conventional quotation printer 14. At the same time, however, the received data are recorded, character-by-character, in the initial stage of shift register 15.

During each cycle of operation of the receiver distributor 13, six bits of code data are recorded in the initial stage of shift register 15, thereby recording a complete data character. When each recording cycle is completed, the characters recorded in the shift register are compared, stage-by-stage, with the pre-recorded programming data in program unit 17. If the characters recorded in the first three stages of the shift register 15 comprise alphabetic characters and correspond to a sequence of three characters recorded in the program unit as identification of a particular stock to be monitored, the program unit is conditioned to actuate readout device 16 for a printing operation in the next cycle of the system. In that next cycle, therefore, the character recorded in the fourth stage of the shift register is transferred by the readout unit to transmitter 18 and, from the transmitter, is supplied to receiver 19 to actuate printer 20. In this manner, the first character of a selected quotation is printed.

Once printing has started, it is continued for each character throughout the time required for the printing of the identifying letters and the following numerical data which, together, afford a complete stock quotation. When the last number is transferred from the shift register through readout unit 16 to transmitter 18, the printing cycle is complete. At this point, program unit 17 again interrogates shift register 15. If it determines that the letters now recorded in the first three stages of the shift register do not correspond to a stock to be monitored, the program unit acts to inhibit readout and printing for an indeterminate time. During this inhibition period, the program unit compares its pre-recorded data with the characters recorded in the first three stages of the shift register during each cycle of operation.

Ultimately, characters identifying another stock from the group to be monitored will be recorded in the first three stages of shift register 15. When this happens, the program unit again conditions readout circuit 16 to initiate a further printing operation. The system continues operation in this manner, with the result that quotation printer 21 prints only the stock quotations relating to those stocks identified by the pre-recorded data in program unit 17. Accordingly, the output from the quotation printer 21 is an edited listing of a limited, selected number of stocks, eliminating checking through all of the other stock quotation emanating from the general data transmitter 11.

In operation, system 10 takes advantage of certain repetitive characteristics of the output signals from data transmitter 11, which are reflected in operation of the receiver distributor unit 13. Thus, in a series of stock quotations, the initial letter of each stock-identifying series of characters is preceded by the last numerical unit from the previous quotation. This is, when a new stock quotation is beginning, and the three characters recorded in the first three stages of shift register 15 are the identifying letter characters for the stock, a numerical character must be recorded in the fourth stage of the register. Consequently, program unit 17 can be constructed to prevent initiation of a readout and printing operation at any time when a numerical character, rather than an alphabetic character, is recorded in the fourth stage of shift register 15. This prevents any spurious operation that might otherwise result from the fact that the codes for some alphabetic characters are the same as for those of some numeric characters except for the identifying "mark" or "space" indication in the sixth code level.

By the same token, the final character of numerical data pertaining to a given quotation is succeeded by a letter indication beginning the next quotation. This makes it possible for program unit 17 to determine the end of a quotation being printed as accurately as it determines the beginning. In the language of the art, system 10 utilizes the "L" functions of the conventional stock data transmission system to control the selective printing or editing operation.

FIG. 2 illustrates, in simplified schematic form, the data transmitter 11, and particularly the transmitter distributor. The transmitter comprises a rotary arm 21 upon which are mounted a main brush unit 22 and an auxiliary brush unit 23. At the upper end of arm 21, the arm is engaged by a latch member 24 controlled by a sending-start electromagnet 25. One terminal of electromagnet 25 is connected to a sending-start switch 26; switch 26 is a normally open switch that is connected to a suitable D.C. supply generally indicated by the battery B+. The other terminal of the sending-start electromagnet is connected to a contact segment 27 that is engaged by one arm of brush unit 23 when rotary arm 21 is located in the stop or rest position, as illustrated in FIG. 2. A similar contact segment 28 is positioned for engagement by the other arm of brush unit 23, when the transmitter is in rest position, segment 28 being returned to ground.

Brush unit 22, like brush unit 23, is provided with two brush elements 31 and 32. Brush element 31 is aligned with an annular contact strip 33 that is electrically connected to the transmission line 12. Brush element 32, on the other hand, is aligned with a series of arcuate contact elements disposed in sequence around the periphery of the contact ring 23. This series of contact segments comprises, in order, a start segment 40, six code segments 41, 42, 43, 44, 45 and 46, and a stop segment 48. Start segment 40 is left open-circuited. Code segments 41–46 are individually connected to six code sensing contacts 51–56, respectively. Contacts 51–56 may, for example, be the sensing elements of a tape or card reader, or they may be individual contacts in an electrical keyboard. Stop segment 48 is connected to a contact bar 58 that is aligned with sensing contacts 51–56. The contact bar is returned to ground through a battery, again designated as B+.

Operation of transmitter distributor 11 is quite conventional and, accordingly, is described only briefly herein. When a given character is to be transmitted, whether alphabetic or numeric, actuation of the keyboard, tape reader, or other input device closes selected contacts from group 51–56 in accordance with the code for that character. Switch 26 is closed, once the code contacts are completed, energizing electromagnet 25. Energization of electromagnet 25 lifts latch member 24, permitting clockwise rotation of rotary arm 21. As soon as arm 21 moves through a relatively short distance, the energizing circuit for magnet 25 is opened, at contacts 27 and 28, de-energizing the sending-start magnet 25 and permitting latch member 24 to return to position to stop arm 21 when the arm again reaches the rest orientation illustrated in FIG. 2.

As arm 21 rotates, brush unit 22 first completes a circuit between the start contact segment 40 and the inner contact ring 33. Inasmuch as segment 40 is open-circuited, it is seen that no electrical potential is supplied to output line 12. This condition, referred to hereinafter as a "space" condition, is the conventional signalling condition at the initiation of transmission of each character.

Continued movement of arm 21 brings brush unit 22 into alignment with the first code segment 41. If sensing contact 51 is closed, output line 12 is connected in an electrical circuit that extends from contact ring 33 through the brushes 31 and 32 of brush unit 22 to code segment 41, and from code segment 41 through contact 51 to contact bar 58 and then to the B+ supply. Under these conditions, a positive D.C. pulse is transmitted over line 12, a condition referred to hereinafter as a "mark" condition. Of course, if sensing contact 51 is open, depending upon the code of the character to be transmitted, then no signal is supplied to output line 12, indicating a "space" condition.

Continued movement of rotary arm 21 sweeps all of the code segments 41–46, sending out a series of pulse signals, "mark" or "space," representative of the character to be transmitted. In accordance with usual practice on stock quotations, contact 56 remains open to afford a "space" signal as the terminal code bit for all alphabetic characters; a "mark" signal in the sixth code level identifies numeric characters. Ultimately, the brush unit 22 on the rotary arm comes into alignment with the stop segment 48, which is permanently connected to the B+ supply. Thus, the final bit of information with respect to each character, alphabetic or numeric, is a "mark" signal, again in accordance with usual practice. As the rotary arm approaches the position illustrated in FIG. 2, its movement is interrupted by engagement with latch member 24. In this position, brush unit 23 again engages auxiliary contact segments 27 and 28 and the transmitter is conditioned for transmission of the next character.

FIG. 3 illustrates the synchronized receiver distributor 13 and shift register 15. The receiver distributor is somewhat similar in construction to transmitter distributor 11. Thus, it comprises a rotary arm 61 which, in this instance, carries a single brush unit 62 comprising inner and outer brush elements 63 and 64. When distributor 13 is in the unactuated or rest position, as shown in FIG. 3, the end portion of rotary arm 61 is engaged by a latch member 65 controlled by a receiving start electromagnet 66.

Inner brush element 63 of distributor 13 is aligned with a three-segment contact ring comprising an arcuate start segment 67, a code segment 68, and a stop segment 69. Outer brush 64, on the other hand, is engageable with a series of arcuate contact segments including a start segment 70, individual code segments 71, 72, 73, 74, 75 and 76, and a printer actuation segment 78. Interspersed between the code segments 71–76 are a series of open-circuited timing segments 81 that are utilized only to compensate for minor departures from synchronism between rotary arms 61 and 21.

The input line 12 from the transmitter is connected to the operating coil 82 of a line relay 83 that is incorporated in distributor 13, the other terminal of coil 82 being returned to ground. Relay 83 includes a movable contact 84 that is engageable with a pair of contacts 85 and 86. The line relay is normally maintained energized by the "mark" signal from the transmitter, as described hereinabove, since this signal condition is maintained continuously when the transmitter is not sending. Consequently, movable contact 84 is engaged with contact 85 whenever the distributor 13 is in its rest position, or under any other circumstance where a "mark" signal is received over line 12. Upon occurrence of a "space" signal, however, contact 84 moves into engagement with contact 86. The movable contact 84 is connected to the B+ supply. Contact 85 is connected to contact segment 68, and contact 86 is connected to segment 67.

One terminal of the winding of electromagnet 66 is connected to contact segment 70, and the other terminal is returned to ground. The individual code contact segments 71, 72, 73, 74, 75 and 76 are individually electrically connected to the operating coils of six relays 91, 92, 93, 94, 95 and 96, respectively. In each instance, the other terminal of the relay coil is returned to ground. Relays 91–96 comprise one-half of a first stage of shift register 15, which includes a total of four stages, as noted above. For convenience, the first stage of shift register 15 is designated generally by reference numeral 101A, and also includes a second bank of relays 101B. The second stage of the shift register includes a first bank of relays 102A and a second bank 102B. The third-stage relays are designated by reference characters 103A and 103B and the fourth and final stage of the register includes the relay banks 104A and 104B. Each bank of relays in each stage includes six relays, one for each level of the code employed.

Each of relays 91–96 is provided with a pair of holding contacts for the operating coil of the relay, these contact pairs being designated by reference numerals 111 through 116. In each instance, one of the holding contacts is connected to the same side of the relay coil as the code segment. The other holding contacts of each pair are connected in parallel with each other to a cam-actuated normally closed switch 117. Switch 117, in turn, is connected to a battery B+ that is returned to ground. The cam element 118 that controls switch 117 is mounted on the shaft 119 for the rotary distributor arm 61, so that the switch 117 is operated in predetermined timed relation to the operation of the distributor, as explained more fully hereinafter in connection with the timing chart of FIG. 4.

In addition to the holding contacts 111–116, the individual storage relays 91–96 in bank 101A of the first stage of the shift register are each provided with a set of output contacts, these contacts being designated by reference numerals 121 through 126. Relay contacts 121 through 126 are all normally open contacts. One contact element of each contact pair 121–126 is connected to a normally closed contact 127 of a second cam-actuated switch 128, the cam element for this switch also being mounted on the distributor shaft 119. The movable contact of switch 128 is returned to ground through the suitable D.C. supply indicated, as before, as a battery B+. The remaining contact in each of contact pairs 121–126 is connected to the operating coil of a corresponding relay in the second bank 101B of the first shift register stage. That is, one contact of contact pair 121 is connected to the operating coil of a relay 131 incorporated in bank 101B, and this arrangement is followed consistently for the remaining relays 132–136 in the second bank of the first shift register stage. The operating coils of relays 131–136 are all returned directly to ground.

Storage relays 131–136 are provided with individual holding contacts designated by reference numerals 141–

146 respectively. One contact in each pair is connected to the operating coil of the associated relay. The other contact in each pair is connected to a second contact 147 of switch 128. Thus, the switch 128 may be utilized to de-energize all of relays 131–136 simultaneously, as described in greater detail hereinafter, this action taking place in timed relation to operation of distributor 13 as explained in connection with the timing chart of FIG. 4.

Relays 131–136 also include a series of output contacts which are designated by reference characters 151 through 156 in FIG. 3. One contact from each of contact pairs 151–156 is connected to a first contact 157 of a cam-actuated control switch 158. Like switches 117 and 128, switch 158 is actuated by a cam mounted on or otherwise operated in synchronism with the rotary movement of the distributor shaft 119. The movable contact of switch 158 is again connected to a suitable D.C. supply such as the battery B+. The other contacts of contact pairs 151 through 156 are individually connected to the operating coils of a corresponding series of relays 161 through 166 that comprise the initial bank 102A in the second stage of shift register 15. Each of the operating coils for these relays is returned to ground.

Relays 161–166 in bank 102A are each provided with a pair of holding contacts, designated in FIG. 4 by reference numerals 171 through 176. The circuit arrangement is similar to relay bank 101A. Thus, one contact of each of pairs 171–176 is connected to the operating coil of the corresponding relay in the series 161–166. The other holding contacts are connected together and are connected to a second contact 177 of the cam-actuated control switch 158.

Relays 161–166 are also provided with a series of individual output contact pairs 181–186. One contact of each of pairs 181–186 is connected to contact 127 of switch 128, this circuit connection being the same as for the output contacts 121–126 in the first bank of relays 101A for the first stage of the shift register. The remaining contact of each pair 181–186 is connected to the succeeding shift register stage 102B.

The relay and circuit arrangement described above for stages 101A, 101B, and 102A is carried out in the successive stages 102B, 103A, 103B and 104A. The circuit arrangement is also carried into stage 104B, which is shown in substantial detail in FIG. 3. Thus, register stage 104B comprises six output relays 191–196. The operating coil of each of these relays is connected to the output contacts of the corresponding relay in the preceding stage 104A and is also returned to ground.

Each of the relays 191 through 196 includes a set of holding contacts, these contacts being designated by reference numerals 201–206. One contact of each of contact pairs 201–206 is connected to the operating coil of the associated relay. The remaining holding contacts are all electrically connected to contact 147 of control switch 128. The relays of stage 104B are also provided with a series of output contacts designated by reference numerals 211 through 216. One contact of each of pairs 211 through 216 is connected to contact 157 of control switch 158. The remaining contact in each pair is separately connected, by means of the associated one of a corresponding series of conductors 221–226, to transmitter distributor 18 (see FIG. 5).

Operation of receiver-distributor 13, and shift register 15 (FIG. 3), is initiated, as noted hereinabove, by a "space" signal from transmitter 11. The "space" signal is, in effect, an interruption in the normal positive potential on line 12. Accordingly, when the initiating "space" signal appears, electromagnet 82 is deenergized and contact 84 drops out of its normal engagement with contact 85 and into engagement with contact 86. As soon as contacts 84 and 86 are closed electromagnet 66 is energized through a circuit extending from the D.C. supply through these contacts to contact segment 67, and from contact 67 through brush unit 62 and contact segment 70 back to the operating coil of the electromagnet. Energization of receive-start magnet 66 lifts latch member 65, releasing arm 61 for rotational movement in a clockwise direction.

As rotary arm 61 begins its sweeping movement, it holds the operating circuit for magnet 66 closed until brush arm 63 clears contact segment 67. Once the rotary arm moves beyond this point, the operating circuit for magnet 66 is open-circuited, permitting latch member 65 to drop back to its normal latching position, where it will be effective to engage the rotary arm and stop its movement at the normal or rest position when the arm has completed a full revolution.

Continued rotation of arm 61 brings the brush unit 62 into bridging contact between the large annular arcuate segment 68 and the relatively short code segment 71. Brush 62 reaches this position in time coincidence with engagement of brush unit 22 with the first code segment 41 of transmitter 11 (FIG. 2). If the first code bit in the character being transmitted is a "space" signal, with no potential on input line 12, the circuit to segment 68 is open at contact 85. Consequently, no energizing output signal is supplied from code segment 71 to the first relay 91 in relay bank 101A of shift register 15. On the other hand, if the received signal is a "mark" signal, then contacts 84 and 85 are closed and a positive potential is supplied to the operating coil of relay 91. The energizing circuit for the relay extends from the battery through contacts 84 and 85 to contact segment 68; from segment 68, the circuit continues through brush unit 62 and code segment 71 to the operating coil of the relay and thence to the ground return. The energizing signal is supplied to the relay only for a short time interval, the time interval required for brush unit 62 to traverse the short code segment 71. However, as soon as relay 91 is energized, contacts 111 are closed. This completes a holding circuit for the relay through the normally closed cam-actuated control switch 117. Hence, the relay 91 is held energized, if energized by a "mark" input signal from the transmitter, for a time interval extending through the end of the cyclic operation of receiver distributor 13, as illustrated in the timing chart of FIG. 4.

When rotation of arm 61 clears brush unit 62 from code segment 71, the brush unit engages the intermediate open circuited buffer segment 81. Subsequently, the brush unit 62 reaches code segment 72 at a time coincident with engagement of transmitter code segment 42 by brush unit 22 (see FIG. 2). Again, if a "space" signal is received by receiver 13 during this time interval, there is no output signal applied to code segment 72 and the second relay 92 in the first bank 101A of the shift register is not energized. If a "mark" signal is received, however, relay 92 is energized through the same circuit as described above with respect to relay 91, except that the code segment involved is segment 72 instead of segment 71. Moreover, if relay 92 is energized, a holding circuit is established through contacts 112 and cam-actuated control switch 117. Accordingly, relay 92 is held energized, if energized by a received "mark" signal, through the remainder of the operating cycle for distributor 13 (see FIG. 4).

The same sequence of operations is carried out with respect to the succeeding code segments 73, 74, 75 and 76 and the associated relays 93, 94, 95 and 96 in the first bank 101A of shift register 15. Accordingly, the received signals are recorded one-by-one in the six relays 91–96 that afford the first bank in the initial stage of the shift register.

Quite early in the operating cycle for transmission of each character, switch 128 is actuated, opening contacts 127 and closing contacts 147. Near the end of the cycle, however, contacts 127 are again closed, this action taking place after relay 96 in the first bank 101A has been actuated.

Upon the closing of contacts 127, and on the assumption that relay 91 has been energized during the first cycle of distributor 13, an energizing circuit is set up from the battery through contacts 127 and contacts 121 of relay 91 to the operating coil of relay 131 in the second bank of relays 101B for the shift register. Similarly, each of the remaining relays in bank 101B is energized if, and only if, the corresponding relay in bank 101A has recorded therein a "mark" signal; that is, if the corresponding relay has been energized. It is thus seen that the received code data representing each character is initially recorded in bank 101A and, near the end of the transmission cycle, is transferred to bank 101B by the operation of switch 128. Focusing attention on the time 231 (FIG. 4) at the end of the first cycle of operation of distributor 13, it is seen that at this point, the first character transmitted remains recorded in relay bank 101A and is also recorded in the relays of bank 101B. This operating cycle ends, of course, when rotary arm 61 again reaches the position shown in FIG. 3, having previously traversed all of the code segments 71–76 and also having passed over the print signal segments 69 and 78. The latter contact segments are employed to supply a print signal to printer 14, which, it will be recalled, is employed to print all of the received information without editing.

In the next cycle of operation, distributor 13 functions as described above. During the initial portion of this cycle, when brush unit 62 is still engaged with start contacts 62 and 70, switch 127 again opens (see FIG. 4) and switch 147 closes. Moreover, switch 117 opens during this same time interval.

The opening of switch 117 is effective to break the energizing circuit for each one of the relays 91–96 that has been energized to record the code data pertaining to the character transmitted during the preceding cycle. The switch is held open only for a short time interval and is closed before brush 62 reaches the first code segment 71. In this manner, the first relay bank 101A is cleared and is ready to receive and record the code data pertaining to the second character.

At approximately the same time as the opening of switch 117, switch 127 opens. This is effective to break any energizing circuits previously completed for the relays of bank 101B through the contacts of the corresponding relays in bank 101A. Each of relays 131–136, however, is provided with a holding circuit through the corresponding set of contacts identified by reference numerals 141–146. Consequently, opening of switch 127 does not clear the recorded information from bank 101B. The holding circuits for relay bank 101B all extend through contact 147 of switch 128, and for this reason it is necessary to close contact 147 before contact 127 opens.

During the next cycle of operation, the second character is recorded in relay bank 101A in the same manner as described hereinabove for the first character. At the beginning of the cycle, contact 177 of switch 158 is closed and contact 157 is open. In the early part of the cycle, however, this condition is reversed, contact 177 opening and contact 157 closing. Because a "mark" signal was received for the first code bit in the first character transmitted, it will be seen that relay 131 has been energized and is still held energized. Consequently, contacts 151 are closed, with the result that the closing of switch contact 157 establishes an energizing circuit for relay 161 that extends from the battery through contact 157 and through relay contacts 151 to the operating coil of relay 161. The same action takes place with respect to each of the remaining relays in bank 102A, the first relay bank in the second stage of shift register 15. Thus, the closing of switch contact 157 is effective to record in relay bank 102A all of the code data previously recorded in bank 101B. Of course, the selective energization of relays 161–166 in bank 102A, which depends upon the code data previously recorded in relays 131–136, closes the holding contacts 171–176 of the relays that are energized.

Later in the second character transmission cycle switch 157 is again opened and switch 177 is closed. In this instance, contact 177 closes before contact 157 opens. This being the case, each of the relays previously energized in bank 102A is held energized through its holding contact and through the circuit connection provided by switch 177, despite the fact that the original energizing circuit through contact 157 is now open. Relays 102A remain energized until after the end of the second cycle, the termination of the second cycle being designated by line 232 in the timing chart of FIG. 4.

At a later point in the second cycle of operation, the information previously recorded in relay bank 102A is passed on to the relays of bank 102B. This transfer operation is controlled by switch 128 in the same manner as the switch controls transfer of recorded data from bank 101A to bank 101B. In the next and third cycle of operation, the data recorded in stage 102B is transferred to relay bank 103A. In that same cycle, ending at point 233 in the timing chart, the data for the first character transmitted is passed on to shift register stage 103B. In the fourth cycle of operation of shift register 15, the same information is initially transferred to relay bank 104A and thereafter recorded in the final bank of relays in the shift register, bank 104B. Thus, in four cycles of operation the first transmitted character passes completely through the shift register and ends up recorded in relay bank 104B. At this point in time, indicated by reference numeral 234 in FIG. 4, the first character is recorded in relay bank 104B. The second character transmitted is present in bank 103B. The third character code is recorded in relay bank 102B and the fourth transmitted character is recorded in bank 101B.

FIG. 5 illustrates the program unit 17, the readout control 16, and the transmitter distributor 18. Transmitter distributor 18 is essentially similar to distributor 11 as described hereinabove in connection with FIG. 2. Thus, it comprises a rotary arm 321 that carries a main brush unit 322 and an auxiliary brush unit 323. The upper end of arm 321 is engaged by a latch member 324 actuated by a sending-start electromagnet 325. One terminal of electromagnet 325 is connected to a short contact segment 327 engaged by the upper arm of brush unit 323 when the rotary arm 321 is in its rest position. A similar small contact segment 328 is engaged by the lower brush of unit 323, segment 328 being returned to ground. The energizing circuit for electromagnet 325 is described in further detail hereinafter.

The first brush element 331 of main brush unit 322 is aligned with an annular contact 333 that is electrically connected to an output line 334 connected to the receiver distributor 19 and thence to the printer 20. The second brush element 332 of the main brush unit, on the other hand, is aligned with arcuate contact elements comprising a start segment 340, six code segments 341, 342, 343, 344, 345 and 346, and stop segment 348. Code segments 341–346 are individually connected to respective corresponding ones of the connecting lines 221–226 coupling transmitter distributor 18 to relays 191–196 in the final stage of shift register 15 (FIG. 3). Stop segment 348 is permanently connected to the B+ supply.

In the construction illustrated in FIG. 5, program unit 17 is physically integrated with shift register 15, the program unit actually comprising a series of auxiliary contacts in the relays of the shift register. Not all of the relays in the shift register are employed in the program unit. Instead, the first five relays in the second bank of each of the first three stages of the shift register are utilized to afford the program unit. Included are relays 131 through 135 of relay bank 101B, relays 241 through 245 of bank 102B, and relays 251 through 255 of bank 103B. Each of these relays is provided with a plurality of additional sets of contacts, one contact set for each stock to be identified and monitored by editing system 10.

The first stage 281 of program unit 17 thus includes one set of contacts in each of relays 131–135, 241–245, and 251–255. Moreover, each of the contact sets includes one normally open and one normally closed contact. For a "space" condition, the output connection from a given set of contacts is made from the normally closed contact of the set. For a "mark" condition, on the other hand, the output connection is taken from the normally open contact. On this basis, it is seen that the coding for relays 251–255 is space-mark-space-mark-mark, this being the code for the letter "G." The coding for relays 241–245 in program unit stage 281 is mark-space-space-space-space, and this is the code for the letter "E." The final portion of program unit stage 281, comprising relays 131–135, is encoded for space-space-space-space-mark, the code for the letter "T." Accordingly, the first stage of the program unit is encoded to identify the letters "GET," reading from bottom to top.

A similar arrangement is employed in the second bank of relay contacts 282 of the program unit 17. Thus, in this portion of the program unit, coding for relays 251–255 is space-space-mark-mark-mark, the code for the letter "M." The contacts of relays 241–245 in this portion of the program unit are encoded as space-space-space-mark-mark, the code for the letter "O." The remaining portion of stage 282 of the program unit is encoded space-mark-mark-space-mark, the code for the letter "P." Thus, program unit stage 282 is encoded for the stock identification "MOP."

There may be as many stages, such as stages 281 and 282, in program unit 17 as there are stocks to be monitored. Intermediate stages have been omitted from FIG. 5, only the final stage 289 being illustrated in addition to previously described stages 281 and 282. In this instance, the relays from shift register bank 103B are encoded mark-mark-space-space-space for the letter "A." The relays from register banks 102B and 101B are each encoded for space-space-space-space-mark, the letter "T." It is thus seen that the final stage 289 of the program unit is encoded for the stock symbol "ATT."

The movable contact in each of the program unit stages 281–289 for the relay 131 is connected to a line 351 that is connected to a normally open contact 352 of a cam-actuated control switch 353. The control switch 353 is operated in synchronism with receiver distributor 13, the cam controlling the switch preferably being mounted on the shaft 199 of the receiver distributor (see FIG. 3). The movable contact of switch 353 is connected to one contact of a normally open contact pair 354 that comprises a part of relay 196, the sixth and final code relay in the final stage, second bank 104B, of the shift register. The other contact of pair 354 is connected to the B+ supply. In addition to normally open contact pair 354, relay 196 is also provided with a pair of normally closed contacts 355 and an additional set of normally open contacts 356. One contact of pair 355 is connected to the B+ supply and the other contact of this pair is connected to a normally closed contact 357 of switch 353. One contact of normally open pair 356 is connected to the D.C. supply and the remaining contact of this pair is connected to one of a pair of normally open contacts 358 of a control relay 359.

Control relay 359 is incorporated in readout control 16, which also comprises another control relay 361 having two pairs of normally open contacts 362 and 363. One of the contacts of pair 362 is connected to contact 357 in switch 353. The remaining contact of pair 362 is connected to the operating coil of relay 361, which is returned to ground. In addition, this second contact of pair 362 is connected to the final contact in each of program unit stages 281–289, the final contact being that associated with relay 255 in each instance.

One of contacts 363 is connected to the B+ supply. The other contact of this pair is connected to one terminal of the operating coil of relay 359, the same terminal of the relay coil being connected to contact of pair 358 in the relay to provide a holding circuit for the relay.

Readout control relay 359 further includes a set of normally open contacts 371 and a set of normally closed contacts 372. One contact of pair 371 is connected to the operating coil for sending-start relay 325 of distributor 18. The other contact of this pair is connected to a normally open cam-actuated switch 373. Switch 373 is synchronized with operation of receiver distributor 13, preferably having its cam control unit mounted on shaft 119 (see FIG. 3). The remaining contact of switch 373 is connected to the B+ supply to afford an energizing circuit for electromagnet 325 as described more fully hereinafter.

One contact of normally closed pair 372 is connected to the D.C. supply. The other contact of this pair is connected to line 324 and, accordingly, to the annular contact segment 333 of transmitter distributor 18.

Operation of program unit 17, readout control 16, and transmitter 18 (FIG. 5) is graphically illustrated in the timing chart of FIG. 6, considered also in conjunction with the shift register timing chart, FIG. 4. As shown in both timing charts, contact 352 of switch 353 closes for a predetremined period in each cycle of character transmission. If relay 196 has been energized, indicating a "mark" condition in the sixth level of the character recorded in shift register bank 104B, then a complete circuit is established from the B+ supply through relay contacts 354 (FIG. 5) and switch contact 352 to the line 351 connecting readout control 16 to program unit 17. This "mark" condition indicates that the character recorded in bank 104B is a numeric character. Thus, relay 196 supplies an actuating signal to the program unit only when numerical data are recorded in the final stage of the shift register.

At a given point in operation of the system, when a quotation on the stock "GET" is being transmitted, conditions are as shown in the first cycle in FIG. 6. The alphabetic characters "T," "E" and "G" are recorded in shift register stages 101B, 102B and 103B respectively. A numeric character, the last character of the preceding quotation, is recorded in stage 104B. Consequently, relay 196 is energized, and contacts 354 are closed.

When switch 353 is actuated to close on contact 352, a complete circuit is established from the B+ supply through contacts 354, contact 352, line 351, and program unit stage 281 to the operating coil of control relay 361. This is a unique circuit, completed only because stage 281 of the program unit is programmed for precisely the latter characters now recorded in stages 101B–103B.

Actuation of relay 361 closes contacts 362 and 363. Closing of contacts 363 energizes the second control relay 359, closing contacts 358 and 371.

Later in the same cycle of operation, switch 353 is returned to its original condition, opening contact 352. But contact 357 closes before 352 opens, so that a holding circuit for relay 361 is completed through contacts 362 of the relay and through switch contact 357. Since relay 361 remains energized, relay 359 remains actuated through contacts 363.

Thereafter, the cyclic operation of shift register 15, illustrated in FIG. 4, transfers the recorded data through the register, establishing the conditions shown in the second cycle illustrated in FIG. 6. In this cycle, the recorded characters in register banks 104B, 103B, 102B, and 101B are "G," "E," "T," and "I," respectively. Since the character in bank 104B is alphabetic, the sixth code level is a "space" code, and relay 196 drops out. When this occurs, contacts 355 of the relay close, completing an alternate holding circuit for relay 361. Hence, when switch 353 is actuated later in the same cycle, relay 361 does not drop out. Rather, it remains energized as long as relay 196 is de-energized; that is, relay 361 remains actuated as long as an alphabetic character is recorded in relay bank 104B of the shift register (see FIG. 6).

Closing of contacts 371 in relay 359, in the first cycle of operation illustrated in FIG. 6, does not establish a complete operating circuit for the send-start magnet 325 of transmitter 18. The reason the circuit is not completed is that switch 373, which is in series in the operating circuit for magnet 325, closes early in the cycle and is opened again at the time that relay 359 is actuated. Accordingly, the numerical figure recorded in relay stage 104B is not transmitted by transmitter 18. Opening of contacts 372, upon actuation of the relay, does not send a starting signal to receiver 19, since output line 334 remains connected to B+ through brush unit 322 and stop segment 348 of the transmitter.

In the second cycle of operation, however, closing of switch 373 completes an operating circuit for send-start magent 325, since relay 359 remains energized and contacts 371 remain closed. Transmitter 18 functions in the same manner as transmitter 11 (FIG. 2), and produces an output signal on line 324 comprising a series of "mark" and "space" signals representative of the character G" recorded in shift register stage 104B during the second cycle of operation. As before, the initiating signal is a "space" signal, produced as soon as brush 322 reaches start segment 340. As long as relay 359 remains actuated, transmitter 18 is triggered to a new cycle of operation each time switch 373 closes, and transmits each of the characters cyclically recorded in shift register stage 104B. Consequently, it is seen that relay 359 determines the number of characters transmitted during a selected quotation; as long as the relay remains actuated, each succeeding character recorded in the final stage of the shift register is transmitted to the receiver 19 and printed by printer apparatus 20 (FIG. 1), or otherwise reproduced for use, as by a visual display, permanent recording on a punched tape, or the like.

In each of the second, third and fourth cycles of operation illustrated in FIG. 6, an alphabetic character is recorded in stage 104B. Since the sixth code level for each alphabetic character is a "space" signal, relay 196 is held de-energized through each of these three cycles of operation, during which the letters "GET" are successively recorded in and transmitted from shift register stage 104B. In the next cycle of operation, however, a numeric character is recorded in shift register stage 104B. Since the code for each numeric character entails a "mark" signal in the sixth code level, relay 196 (FIGS. 3, 5) is actuated as soon as the numeric character is recorded in the final shift register bank.

When relay 196 is energized, relay 361 (FIG. 5) is de-energized, since it has been held in actuated condition by a holding circuit through its contacts 362 and through the normally closed contacts 355 of relay 196, which have now been opened. When relay 361 drops out, the intial operating circuit for relay 359 is also interrupted, since contacts 363 are opened. However, relay 359 remains energized through its own contacts 358 and through contacts 356 of relay 196, which have now been closed. Thus, this secondary energizing circuit for relay 359 maintains the relay energized in succeeding cycles of operation during which a numerical character is recorded in stage 104B of the shift register. This makes it possible for switch 373 to continue to actuate transmitter 18 in each succeding cycle of operation, so that the numerical characters from the quotation are transmitted to printing apparatus 19, 20 immediately following the alphabetic characters identifying the quotation. In FIG. 6, three succeeding numercial characters ahe shown as a part of the complete quotation "GET 123."

Ultimately, however, and as shown by the final completed cycle illustrated in FIG. 6, alphabetic character from the next quotation is recorded in shift register stage 104B. When this occurs, and since the sixth level code for alphabetic characters is a "space" code, relay 196 drops out. This opens contacts 356 (FIG. 5) and interrupts the operating circuit for relay 359. Consequently, relay 359 drops out, breaking the circuit for send-start magnet 325 at relay contacts 371 before switch 373 closes. Accordingly, the transmitter does not operate in this cycle and the alphabetic character recorded in stage 104B as a part of the succeeding quotation is not transmitted by transmitter 18.

The foregoing description of interruption of transmitter operation holds true only if the next succeeding quote, identified by letters XYZ, is not a selected quotation previously programmed in program unit 17. Thus, in the cycle of opertaion preceding that in which relay 359 releases, in FIG. 6, the characters recorded in stages 101B, 102B and 103B are all alphabetic characters and the character in stage 104B is a numeric character. If characters XYZ represent a quotation to be monitored, then actuation of switch 353 would again initiate a printing operation since a complete circuit would be established through program unit 17. This printing operation would go forward in precisely the same manner as described hereinabove for the selection and printing of the quotation "GET 123."

It is not essential that each quotation include exactly three letters for identification purposes. Additional letters can be accommodated by adding further stages to the shift register and associated program unit. That, is if there are a maximum of $n$ characters identifying each quote, there must be at least $n$ levels in the program unit and in the shift register; preferably, and as described above, $n+1$ stages are used in the shift register.

Moreover, the number of characteristic symbols for each data item need not be uniform. Thus, if a desired stock is identified only by the letters GE, this can be set up in the program unit by connecting one stage thereof in the manner shown in FIG. 5, in stage 281, for letters G and E in relay banks 103B and 102B respectively. Bank 101B is then bypassed entirely, in the program unit, except that relay B6 (FIG. 3) is utilized to make sure that the sixth level code for the character recorded therein is a "mark," indicating a numeral character. Thus, the program unit can distinguish overlapping and variable length quote identifications without substantial difficulty or expense. A similar arrangement may be used for a mixed alpha-numeric identification, e.g., G7T, but the first and last symbols should be alphabetic.

From the foregoing description, it is seen that the monitoring or editing system of the present invention is effective to prepare a restricted list of desired quotations regardless of the length of individual quotes. Selection is effected on the basis of the characters entailed in the transmitted data and does not require special code symbols indicating the beginning or the end of individual quotations. Recognition of the beginning and end of individual quotations is effected on the basis of the conventional permutation code used for market quotations and more particularly on the characteristic code data identifying alphabetic and numeric characters.

Hence, while preferred embodiments of the invention have been described and illustrated, it is to be understood that they are capable of variation and modification, and I therefore do not wish to be limited to the precise details set forth, but desire to avail myself of such changes and alterations as fall within the purview of the following claims.

I claim:

1. An editing system for selecting and reproducing only preselected wanted items of data from a general transmission, in code form, including a variety of unwanted data items, each data item including between one and $n$ identifying alphabetic characters, and at least one numeric character following the identifying characters, comprising:

a register comprising at least $n$ stages each adapted to record one data character;

receiving means for receiving said general transmission and recording each character, in succession, in the register;

cyclically operable means for advancing the characters through the register from an initial stage to a final stage;

programming means, connected to the register, for recording program data identifying all wanted data items and for comparing said program data with the data recorded in said register each time a new character is recorded in the register;

reproducing means, connected to said register;

and read out control means, connected to said programming means and to said reproducing means, for initiating cyclic transmission of recorded data from the final stage of said register to said reproducing means when the identifying data recorded in the register corresponds to a wanted data item identification preceded by a character identifying the start of a data item.

2. An editing system for selecting and reproducing only preselected wanted items of data from a general transmission, in code form, including a variety of unwanted data items, each date item including between one and $n$ identifying alphabetic characters, and at least one numeric character following the identifying characters, comprising:

a register comprising $n+1$ stages each adapted to record one data character;

receiving means for receiving said general transmission and recording each character, in succession, in the first stage of the register;

cyclically operable means for advancing the characters through the successive stages of the register;

programming means, connected to the first $n$ stages of the register, for recording program data identifying all wanted data items and for comparing said program data with the data recorded in said first $n$ stages of the register each time a new character is recorded in the register;

reproducing means, connected to said register;

and read out control means, connected to said programming means, to said reproducing means, and to the final stage of said register, for initiating transmission of recorded data from said register to said reproducing means only when the recorded identifying data in the first $n$ stages of the register corresponds to a wanted data item identification and the character recorded in the last stage of the register is a numeric.

3. An editing system for selecting and reproducing only wanted items of data from a general transmission, in code form, including a variety of unwanted data items, each data item including between one and $n$ identifying alphabetic characters, and at least one numeric character following the identifying characters, comprising:

a register comprising at least $n$ stages each adapted to record one data character;

receiving means for receiving said general transmission and recording each character, in succession, in the register;

cyclically operable means for advancing the characters through the register;

programming means, connected to the register, for recording program data identifying all wanted data items and for comparing said program data with the data recorded in said register each time a new character is recorded in the register;

reproducing means, connected to said register;

read out control means, connected to said programming means, to said reproducing means, and to a readout stage of said register, for initiating and maintaining transmission of recorded data from said register to said reproducing means when the recorded identifying data in the register corresponds to a wanted data item identification and has been preceded by a numeric character;

and reproduction termination means, included in said control means, for terminating transmission of data to said reproducing means when an alphabetic character is subsequently recorded in the readout stage of the register.

4. An editing system for selecting and reproducing only preselected wanted items of data from a general transmission, in code form, including a variety of unwanted data items, each data item including between one and $n$ identifying alphabetic characters, and at least one numeric character following the identifying characters, comprising:

a register comprising $n+1$ stages each adapted to record one data character;

receiving means for receiving said general transmission and recording each character, in succession, in the first stage of the register;

cyclically operable means for advancing the characters through the successive stages of the register;

programming means, connected to the first $n$ stages of the register, for recording program data identifying all wanted data items and for comparing said program data with the data recorded in said first $n$ stages of said register each time a new character is recorded in the register;

reproducing means, connected to the final stage of said register;

read out control means, connected to said programming means and to said reproducing means, for initiating transmission of recorded data from the final stage of said register to said reproducing means only when the recorded identifying data in the first $n$ stages of the register corresponds to a wanted data item identification and the character recorded in the final stage is a numeric character;

and reproduction termination means, included in said control means, for terminating transmission of data to said reproducing means only when an alphabetic character from an unwanted data item is subsequently recorded in the final stage of the register.

5. An editing system for selecting and reproducing only wanted items of data from a general transmission, in a multi-level digital code having one level used to distinguish between alphabetic and numeric characters, and including a variety of unwanted data items, each data item including between one and $n$ identifying alphabetic characters, and at least one numeric character following the indentifying characters, comprising:

a shift register comprising $n+1$ stages each adapted to record one data character, each stage including a recording device for each code level;

receiving means for receiving said general transmission and recording each character, in succession, in the first stage of the shift register;

cyclically operable means for advancing the characters through the successive stages of the shift register;

programming means, connected to the shift register, for recording program data identifying all wanted data items and for comparing said program data with the data recorded in the first $n$ stages of said register each time a new character is recorded in the first stage of the register;

reproducing means, connected to the last stage of said register;

and readout control means, connected to said programming means, to said reproducing means, and to the recording device in said one code level of the final stage of said shift register, for initiating transmission of recorded data from said register to said reproducing means only when the recorded identifying data in the first $n$ stages of the register corresponds to a wanted data item identification and said recording device in said one code level of said final stage has recorded therein data representative of a numeric character.

6. An editing system for selecting and reproducing only wanted items of data from a general transmission, a multi-level digital code having a code level that distinguishes alphabetic characters from numeric characters, and including a variety of unwanted data items, each data item including between one and $n$ identifying alphabetic characters, but at least one numeric character following the identifying characters, comprising:
- a register comprising $n+1$ stages each including a plurality of relays sufficient to record one data character and a final relay stage for recording at least the code level data of a character;
- receiving means for receiving said general transmission and recording each character, in succession, in the first stage of the register;
- cyclically operable means for advancing the characters through the successive stages of the register by one stage each time an additional character is received;
- programming means, connected to the register, for recording program data identifying all wanted data items and for comparing said program data with the data recorded in said register each time a new character is recorded in the register, said programming means comprising a series of contacts in the relays of said register and means for interconnecting said contacts in a plurality of identification circuits characteristics of wanted data items;
- reproducing means, connected to said register;
- and readout control means, connected to said programming means and to said reproducing means, for initiating transmission of recorded data from said register to said reproducing means only when the recorded identifying data in the first $n$ stages of the register corresponds to a wanted data item identification and said final stage code level relay is in an operating condition characteristic of a numeric character.

7. An editing system for selecting and reproducing only preselected wanted items of data from a cyclic character-by-character general transmission, in code form, including a variety of unwanted data items, each data item including from one to $n$ identifying alphabetic characters, and at least one numeric character following the identifying characters, comprising:
- programming means for recording program data identifying all wanted data items;
- a shift register, having at least $n$ stages, synchronized with said cyclic transmission for recording all received data;
- means for comparing said program data with the data in said shift register in each character cycle;
- reproducing means;
- readout means, connecting the final stage of the register to said reproducing means, for transmitting data from said register to said reproducing means for an indeterminate number of character cycles following a determination of identity, in said comparing means, between the data in the shift register and the program data identifying a wanted data item;
- and reproduction inhibiting means, in said readout means, preventing initiation of reproduction except when the wanted data item is preceded by a numeric character.

8. An editing system for selecting and reproducing only preselected wanted items of data from a general cyclic character-by-character transmission, in code form, including a variety of unwanted data items, each data item including from one to $n$ identifying alphabetic characters, and at least one numeric character following the identifying characters, comprising:
- programming means for recording program data identifying all wanted data items;
- a shift register, synchronized with said cyclic transmission, and having $n+1$ stages, for recording all received data;
- means for comparing said program data with the data in the first $n$ stages of said shift register in each character cycle;
- reproducing means;
- readout means connecting the final stage of the register to said reproducing means, for supplying data from said final stage to said reproducing means for an indeterminate number of character cycles following a determination of identity, in said comparing means, between the data in the first $n$ stages of the shift register and the program data identifying a wanted data item;
- reproduction inhibiting means, in said readout means, preventing initiation of reproduction except when a numeric character is recorded in the final stage of the register;
- and reproduction cutoff means, connected to the final stage of the register, for interrupting reproduction when an alphabetic character is subsequently recorded in said final stage.

9. An editing system for selecting and reproducing only preselected wanted items of data from a cyclic general transmission, in a multi-level digital code, including a variety of unwanted data items, each data item including from one to $n$ identifying alphabetic characters, and at least one numeric character following the identifying characters, comprising:
- a shift register, having at least $n$ stages, for recording all received data, each stage including a relay for each code level;
- programming means for recording program data identifying all wanted data items, and for comparing said program data with the data in said shift register each time a new character is received, said programming means including a series of auxiliary contacts in said shift register relays, connecting means establishing a plurality of different circuits through said auxiliary contacts, one circuit for each wanted data item, and a cyclically operable interrogation device connected to all such circuits;
- reproducing means;
- readout means, connecting the register to said reproducing means, for supplying data from said register to said reproducing means for an indeterminate number of character cycles following a determination of identity, in said programming means, between the data in the shift register and the program data identifying a wanted data item;
- and reproduction inhibiting means, in said readout means, preventing initiation of reproduction except when the wanted data item is preceded by a numeric character.

10. An editing system for selectively recording multi-bit character code data items from a start-stop permutation code telegraph receiver, comprising:
- a multi-stage shift register, coupled to said receiver, of the kind in which each character code is advanced one stage and one character code is discharged each time a newly received character code is entered in the first stage, for temporarily storing code data from said receiver on a character-by-character basis;
- recording means, coupled to said shift register, for recording characters corresponding to the character codes discharged from said shift register;
- inhibiting means for suppressing operation of said recording means, actuatable between a normal inhibit condition and a released condition in which operation of said recording means is enabled;
- and first and second control means conjointly actuating said inhibiting means on a character-by-character basis,
- said first control means comprising a first comparator for comparing individual character codes stored in said shift register with a predetermined pattern of codes, and said second control means comprising a second comparator for comparing one chosen bit in each character code with the corresponding bit in the preceding character code in a given stage of the shift register.

References Cited by the Examiner

UNITED STATES PATENTS

| | | | |
|---|---|---|---|
| 2,544,835 | 5/1951 | Mallina | 340—172.5 |
| 2,688,656 | 9/1954 | Wright et al. | 340—172.5 |
| 2,854,652 | 9/1958 | Smith | 340—172.5 |
| 2,877,449 | 3/1959 | Whitney | 340—172.5 |
| 2,892,182 | 6/1959 | Neff | 340—172.5 |
| 3,119,098 | 1/1964 | Meade | 340—172.5 |

ROBERT C. BAILEY, *Primary Examiner.*

MALCOLM A. MORRISON, *Examiner.*

W. M. BECKER, R. M. RICKERT, *Assistant Examiners.*